United States Patent [19]
Belschner

[11] Patent Number: 6,029,108
[45] Date of Patent: Feb. 22, 2000

[54] BRAKE DEVICE FOR VEHICLES

[75] Inventor: Ralf Belschner, Esslingen, Germany

[73] Assignee: Daimlerchrysler AG, Germany

[21] Appl. No.: 09/217,083

[22] Filed: Dec. 21, 1998

[30] Foreign Application Priority Data

Dec. 20, 1997 [DE] Germany .............................. 197 56 976

[51] Int. Cl.⁷ ...................................................... B60L 1/00
[52] U.S. Cl. .................. 701/70; 701/71; 701/76; 701/78; 307/9.1; 307/18; 307/43
[58] Field of Search ................................. 701/70, 71, 76, 701/78; 303/122.05; 307/9.1, 10.1, 10.7, 18, 43

[56] References Cited

U.S. PATENT DOCUMENTS 4,819,597  4/1989  Gale et al. ............................... 123/399
5,675,189  10/1997  Anma et al. ............................. 307/90.1

FOREIGN PATENT DOCUMENTS 195 26 250
  A1 of 0000  Germany .

Primary Examiner—William A. Cuchlinski, Jr.
Assistant Examiner—Yonel Beaulieu
Attorney, Agent, or Firm—Evenson Mckeown Edwards & Lenahan P.L.L.C.

[57] ABSTRACT

A vehicle brake device has wheel brake actuators or wheel brake units which are provided with electronic circuits. The actuator or units can be actuated by at least one redundant communications system. Transmission of data takes place on the at least one communications system according to a predefinable communications matrix in a time-controlled and fault-tolerant manner.

12 Claims, 2 Drawing Sheets

BRAKE DEVICE FOR VEHICLES

BACKGROUND OF THE INVENTION

This application claims the priority of German application No. 197 56 976.5, filed Dec. 20, 1997, the disclosure of which is expressly incorporated by reference herein.

The present invention relates to a brake device for vehicles, in which wheel brake actuators (wheel brake units) are provided with electronic circuits by at least one communications system.

A brake and steering system for a vehicle in which the wheel brakes and the steering system of the vehicle can be actuated by a communications system is disclosed, for example, in DE 195 26 250 A1. In order to avoid a continuous mechanical connection between the steering wheel which can be activated by the driver and the steered wheels and in order to avoid a continuous mechanical and/or hydraulic connection between the brake pedal which can be activated by the driver and the service brake for the wheels, a fault-tolerant, preferably redundant arithmetic unit determines a desired braking effect at least for each wheel. A desired steering effect is determined for each wheel with a steering function, on the basis of sensor signals. The braking function and the steering function for the wheels are closed-loop and/or open-loop controlled by setpoint value systems on the basis of the desired braking effect and desired steering effect which are determined.

A redundant communications system, for example, a databus which is of a redundant design, is used to transmit the data.

A problem with such a brake and steering system is that in order to construct a fault tolerance system a large number of data has to be transmitted simultaneously. In particular, a large number of additional data management messages has to be transported via the communications system.

SUMMARY OF THE INVENTION

An object of the present invention is, therefore, to provide a brake device for vehicles such that, when messages which are as short as possible are transmitted on the communications system, it is fault-tolerant to the extent that any simple fault in the at least one communications system does not lead to a loss of the transmitted information.

This object has been achieved according to the present invention in a brake device for vehicles by transmission of data on the-at least one communications system according to a predefinable communications matrix in a time-controlled and fault-tolerant fashion.

The time-controlled transmission of data on the at least one communications system in accordance with a predefinable communications matrix has the particularly great advantage that time-critical information can be transmitted deterministically with messages of short length and with a small number of data management messages.

No detailed information has been given up to now with regard to the generation of the data to be transmitted. In purely theoretical terms, any method of generating messages which is redundant and in this respect satisfies the specifications necessary in a vehicle is contemplated as being within the scope of the present invention.

Advantageously, at least two central processors transmit control signals in a redundant fashion to the wheel brake units via the at least one communications system. The two central processors which output control signals in a redundant fashion ensure that, even if one of the two central processors fails, further transmission of control signals to the wheel brake units is ensured.

The communication system may, in purely theoretical terms, be configured in a great variety of ways. In a particularly advantageous embodiment, the communications system comprises two databuses, on which each central processor transmits with offset timing in relation to the other data, and each central processor can receive all the data available on the communications system.

With regard to the power supply of the two central processors, the two central computers are advantageously fed simultaneously from two power supply units which are independent of one another and are decoupled. As a result, the central processors are ensured to operate even when one power supply unit fails.

In order to permit, in particular, a very high degree of modularity and exchangeability, the wheel brake units which are connected to the communications system, and possibly further electrical circuits, are advantageously connected via an interface which is adapted to the communications system.

For the power supply of the four wheel brake devices, they are advantageously fed by the two independent power supply units. In this way, if one power supply unit fails, at least emergency operation allows, by a braking effect to be generated.

So that sensors, for example wheel speed sensors or sensors for acquiring information relating to the desire for braking can be connected to the communication system and/or the central processors, information that has been acquired by sensors can advantageously be transmitted to the at least two central processors via the communications system and/or via additional data lines. Thereby, the communications system can be used not only to transmit control signals but also to transmit sensor signals. Alternatively or additionally thereto, the information which has been acquired by the sensors can also be transmitted to the two central processors via additional data lines, depending on the safety and availability aspects.

In particular, the sensors of a pedal module can be connected either directly to the at least two central processors or directly to the time-controlled and fault-tolerant bus system. The driver's desire is acquired by the sensors of the pedal module by way of the position of the pedal and is processed in the pedal module.

The pedal module is likewise advantageously fed by the at least two independent and decoupled power supply units. As far as the arrangement of the at least two central processors is concerned, a very wide of range of embodiments are contemplated as being within the scope of the present invention.

An advantageous embodiment provides for the at least two central processors to be integrated in the pedal module. In addition, at least two power supply units can be provided with monitoring devices. These monitoring devices are also advantageously connected to the central processors, the sensors and the wheel brake devices via the at least one communications system.

BRIEF DESCRIPTION OF THE DRAWINGS

These and further objects, features and advantages of the present invention will become more apparent from the following detailed description of a currently preferred embodiments when taken in conjunction with the accompanying drawings wherein.

DETAILED DESCRIPTION OF THE DRAWINGS

For the sake of better comprehension, in the first instance a number of definitions of terms on which this application is based will be explained below:

Fail-safe property (source DIN 19 250): ability of a technical system to remain in the safe state when specific failures occur or to go directly into another safe state; also referred to as fault-tolerance;

Fault (DIN 19 250): failure of at least one requirement which is made of a necessary feature of a unit under consideration to be fulfilled:

Fault tolerance: capability of a system to fulfil its specified function even with a limited number of faulty subsystems;

Redundancy: presence of more means than are necessary per se for the execution of the envisaged tasks.

Fail-silent: the property of a component or a system which communicates with other systems to refrain from transmitting any further information when a fault within the component or within the system is detected.

Figure 1:
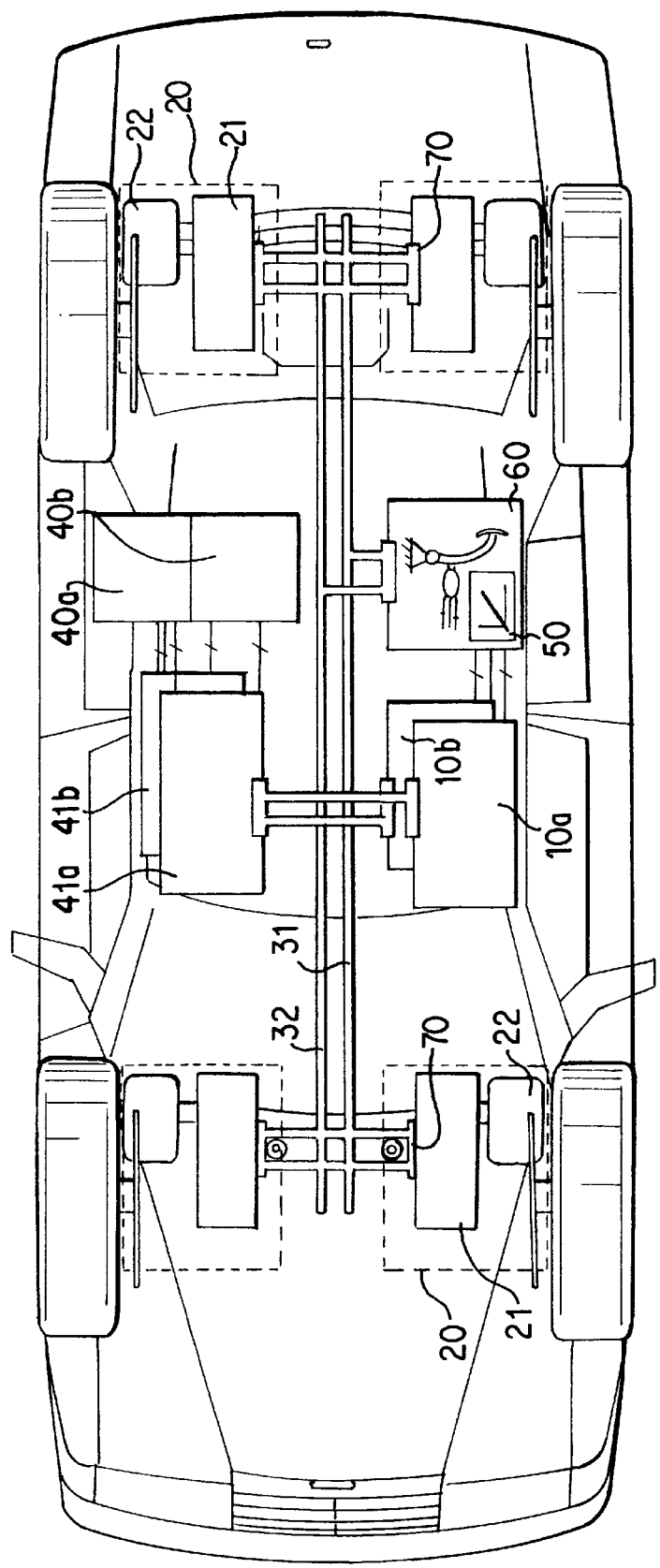
FIG. 1 is a schematic view of a vehicle brake device embodying the present invention.

FIG. 1 illustrates a so-called brake-by-wire brake device of a motor vehicle which comprises central processors 10a, 10b and wheel brake units 20. The wheel brake units 20 each have an electronic wheel brake system 21 and a brake actuator 22 which can be driven electronically. The wheel brake units 20 communicate with the central processor 10 via two databuses 31, 32. The central processors 10a, 10b and the wheel brake units 20 are supplied by two redundant power supply units 40a, 40b which are themselves connected to two monitoring devices 41a, 41b for the power supply units 40a, 40b.

The units are each connected to the databuses via a communications interface 70 by way of which the units have access to protocol services which are known per se.

In order to acquire information on demands for braking operations, a pedal module is provided with sensors, for example conventional pedal travel sensor 50 and wheel speed sensors (not illustrated) whose output signals are passed on to the two central processors 10a, 10b either directly via control lines and/or via the two databuses 31, 32.

Figure 2:
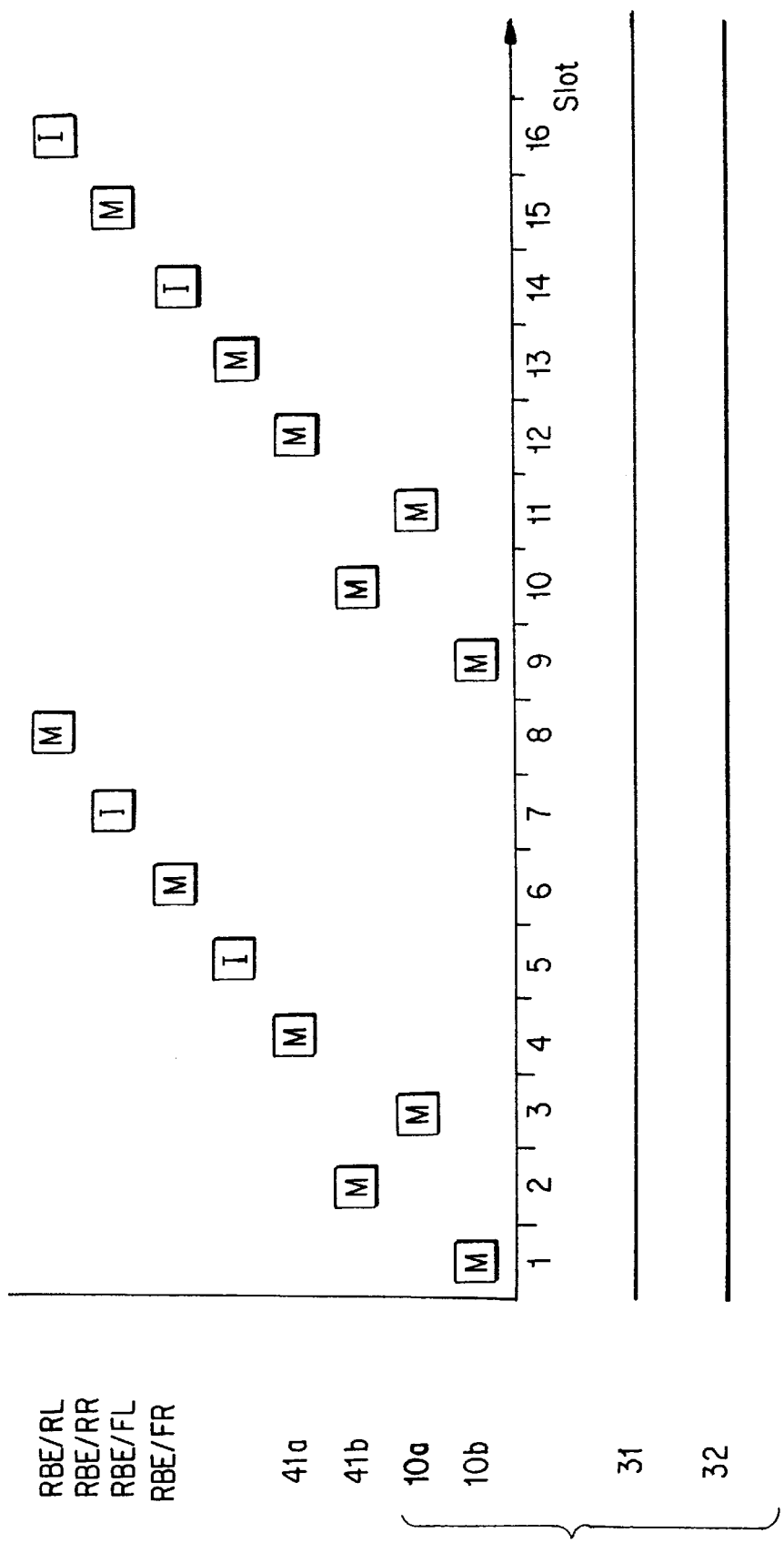
FIG. 2 is a schematic view of a communications matrix for transmitting data on a communications system in accordance with the present invention.

The data are transmitted on the two databuses 31, 32 forming the communications system in a time-controlled manner as illustrated in FIG. 2. In FIG. 2 WBU means wheel brake unit, R means rear, F means front, L means left and R means right. WBU/RL means, for example, the wheel brake unit at the rear on the left. Numerals 10 and 41 designate in FIG. 2, as in FIG. 1, the two central processors and the monitoring devices of the power supply units, and numerals 31, 32 designate the two databuses.

As is clear from FIG. 2, the transmission of one message (Message M) takes place simultaneously in predefinable time periods on the two databuses, it being predefined in a "timetable" like manner which of the units connected to the two databuses 31, 32 transmit messages at what time. In addition to these control messages M, so-called initialization messages (I-frame I) are transmitted on the databuses 31, 32 and these serve, in a manner known per se, to initialize and synchronize the units which are connected to the databuses 31, 32.

The illustrated transmission of messages according to a predefinable communications matrix in a time-controlled and fault-tolerant manner allows any particular fault to be tolerated while remaining fully functional, and in this respect permits faults tolerance. All the units which are connected to the databuses 31, 32 are fail-silent/fail-safe components in this context. This applies also to the pedal travel sensor 50 if it is connected directly to the databus system. In the event of a failure of a wheel brake device, the distribution of braking power is adapted by the central processors 10. Furthermore, the redundant power supply units 40 are continuously monitored in the form of a redundant vehicle-mounted electrical system with, for example, 12 V/14 V and 36 V/42 V vehicle voltage by the monitoring devices 41a, 41b.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Brake device for vehicles, in which wheel brake actuators provided with electronic circuits are actuatable by at least one redundant communications system, wherein means is provided for transmission of data on the at least one communications system so as to take place according to a predefinable communications matrix in a time-controlled and fault-tolerant manner.

2. Brake device according to claim 1, wherein at least two central processors are operatively arranged to transmit control signals in a redundant manner to the wheel brake units via the at least one communications system.

3. Brake device according to claim 2, wherein the at least one communications system comprises two databuses on which each of the central processors transmits data with offset timing in relation to the other data, and each of the central processors is configured to receive all the data available on the communications system.

4. Brake device according to claim 2, wherein the at least two central processors are fed by two decoupled, independent power supply units.

5. Brake device according to claim 1, wherein each wheel brake unit is connected to the at least one communications system via an interface with the communications system.

6. Brake device according to claim 5, wherein each wheel brake unit is fed by at least two independent and decoupled power supply units.

7. Brake device according to claim 2, wherein information acquired by sensors is transmittable to the at least two central processors via the at least one communications system and/or via additional data lines.

8. Brake device according to claim 1, wherein the sensors of a pedal module are operatively connected to one of the at least two central processors and directly to the time-controlled and fault-tolerant bus system.

9. Brake device according to claim 8, wherein the pedal module is fed by at least two independent and decoupled power supply units.

10. Brake device according to claim 2, wherein the central processors are integrated in a pedal module.

11. Brake device according to claim 4, wherein the power supply units are operatively connected to two central processors via two redundant monitoring devices and the at least one communications system.

12. Brake device according to claim 1, wherein the predefinable communications matrix of the data transmission means is configured to predefine which of redundant power supply units associated with databuses operatively connected with the electronic circuits transmit messages via the associated databuses at specified times.

* * * * *